US009833037B2

(12) United States Patent
Wilson, III

(10) Patent No.: US 9,833,037 B2
(45) Date of Patent: Dec. 5, 2017

(54) NATURAL RUBBER OUTSOLES AND FOOTWEAR

(71) Applicant: NIKE, Inc., Beaverton, OR (US)

(72) Inventor: Thomas W. Wilson, III, Hillsboro, OR (US)

(73) Assignee: NIKE, Inc., Beaverton, OR (US)

( * ) Notice: Subject to any disclaimer, the term of this patent is extended or adjusted under 35 U.S.C. 154(b) by 330 days.

(21) Appl. No.: 14/076,838

(22) Filed: Nov. 11, 2013

(65) Prior Publication Data

US 2015/0133580 A1    May 14, 2015

(51) Int. Cl.
| | |
|---|---|
| *A43B 13/04* | (2006.01) |
| *C08L 9/00* | (2006.01) |
| *A43B 13/12* | (2006.01) |
| *A43B 13/22* | (2006.01) |
| *C08C 1/04* | (2006.01) |

(52) U.S. Cl.
CPC ............ *A43B 13/04* (2013.01); *A43B 13/122* (2013.01); *A43B 13/22* (2013.01); *A43B 13/223* (2013.01); *C08C 1/04* (2013.01); *C08L 9/00* (2013.01); *C08L 2205/035* (2013.01)

(58) Field of Classification Search
CPC ...................................................... A43B 13/04
See application file for complete search history.

(56) References Cited

U.S. PATENT DOCUMENTS

| | | | |
|---|---|---|---|
| 2,626,882 A | 1/1953 | Gerke | |
| 4,559,378 A | 12/1985 | Kay et al. | |
| 5,006,603 A * | 4/1991 | Takaki et al. | 525/105 |
| 7,211,611 B2 * | 5/2007 | Wilson, III | 524/368 |
| 2009/0126223 A1 | 5/2009 | Metzger | |
| 2012/0023781 A1 * | 2/2012 | Dojan | A43B 13/122 36/103 |
| 2012/0233886 A1 | 9/2012 | Madore et al. | |
| 2013/0000158 A1 | 1/2013 | Dojan | |
| 2013/0253088 A1 | 9/2013 | Agarwal | |
| 2014/0288255 A1 * | 9/2014 | Martin | C08C 2/02 526/340.4 |

FOREIGN PATENT DOCUMENTS

| | | |
|---|---|---|
| DE | 2624030 A1 | 12/1977 |
| EP | 2599826 A1 | 6/2013 |
| GB | 613121 A | 11/1948 |
| GB | 2168360 A | 6/1986 |

OTHER PUBLICATIONS

Rosenthal, Fast Company magazine, Another Rubber Tree Plant Article, May 1, 2007, 4 pages.*

(Continued)

*Primary Examiner* — Peter F Godenschwager
(74) *Attorney, Agent, or Firm* — Brinks Gilson & Lione

(57) ABSTRACT

An elastomer composition includes guayule rubber and a butadiene rubber, with at least about 5 phr guayule rubber based on 100 phr elastomer. The cured rubber has a higher coefficient of friction as compared to a cured rubber of the same formulation except using Hevea rubber rather than guayule rubber.

20 Claims, 2 Drawing Sheets

(56) References Cited

OTHER PUBLICATIONS

Database CA [Online] Chemical Abstracts Service, Columbus, Ohio, US; Jan. 2, 2014 (Jan. 2, 2014), You Xiaoming et al: "Tread rubber for vehicle tire", XP002737043, retrieved from STN Database accession No. 2014:1695 abstract.
Ross L. Morris et al: "Effect of blending natural rubbers with GR-S", Industrial & Engineering Chemistry, vol. 39, No. 1, Jan. 1, 1944 (Jan. 1, 1944), pp. 60-63, XP055174707, ISSN: 0019-7866.
Winkler D. S. et al: "Guayule Rubber: Vulvanization Properties of Gum and Filled Stocks", Rubber Chemistry and Technology, American Chemical Society, Rubber Division, US, vol. 50, No. 5, Nov. 1, 1977 (Nov. 1, 1977), pp. 981-987, XP009182530, ISSN: 0035-9475.
Written Opinion and International Search Report for PCT/US2014/064796 dated Mar. 27, 2015.

\* cited by examiner

NATURAL RUBBER OUTSOLES AND FOOTWEAR

FIELD OF THE INVENTION

The invention concerns rubber compositions and rubber articles, particularly those providing traction. In a particular aspect, the invention concerns rubber compositions for outsoles for footwear, outsoles made from the compositions, particularly those providing traction, and articles of footwear having outsoles with traction elements.

BACKGROUND

This section provides information helpful in understanding the invention but that is not necessarily prior art.

Synthetic and natural rubbers have a variety of unique and useful physical properties. Rubber compositions are generally reacted with crosslinkers, such as sulfur or peroxide compounds, to cure the rubber. Rubber has been used to make outsoles for footwear, such as athletic footwear. Rubber outsoles and rubber traction elements of outsoles provide traction for the athlete. However, fraction may be affected by wet surfaces.

SUMMARY OF THE DISCLOSURE

Provided are articles of cured elastomer comprising guayule rubber and a butadiene rubber. Cured elastomers of this compositions may have a dynamic coefficient of friction of at least about 0.95 measured according to ASTM F2913. In various embodiments, the dynamic coefficient of friction for the articles of cured elastomer may be from about 0.95 up to about 1.25 measured according to ASTM F2913. Further provided are such articles in which a surface or portion of a surface of the cured elastomer provides traction during use of the article. In a particular embodiment, footwear outsole includes a cured elastomer having a dynamic coefficient of friction of at least about 0.95 measured according to ASTM F2913. The outsole may include the cured rubber as one or a plurality of traction elements of the outsole.

Also provided are elastomer compositions including guayule rubber and a butadiene rubber, a curing agent, and optionally other components, in which the guayule rubber is from about 5 to about 20 parts per hundred (phr) based on 100 phr elastomer and the combined weights of the guayule and butadiene rubbers are at least about 75 phr based on 100 phr elastomer. Further provided are articles formed from curing the elastomer compositions. In various embodiments, the articles include a traction element or other surface of the cured elastomer composition.

Articles of the cured rubber compositions or having traction elements of the cured composition exhibit improved fraction, particular on wet surfaces. In particular, footwear having an outsole of the cured rubber composition or having an outsole containing traction elements of the cured rubber composition exhibit improved traction, particular on wet surfaces.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiment. The terms "comprises," "comprising," "including," and "having," are inclusive and therefore specify the presence of stated items, but do not preclude the presence of other items. As used in this specification, using the term "or" includes any and all combinations of one or more of the listed items.

BRIEF DESCRIPTION OF THE DRAWING

Some embodiments are illustrated by way of example, and not by way of limitation, in the figures of the accompanying drawings and in which like reference numerals refer to similar elements.

DETAILED DESCRIPTION

Figure 1:
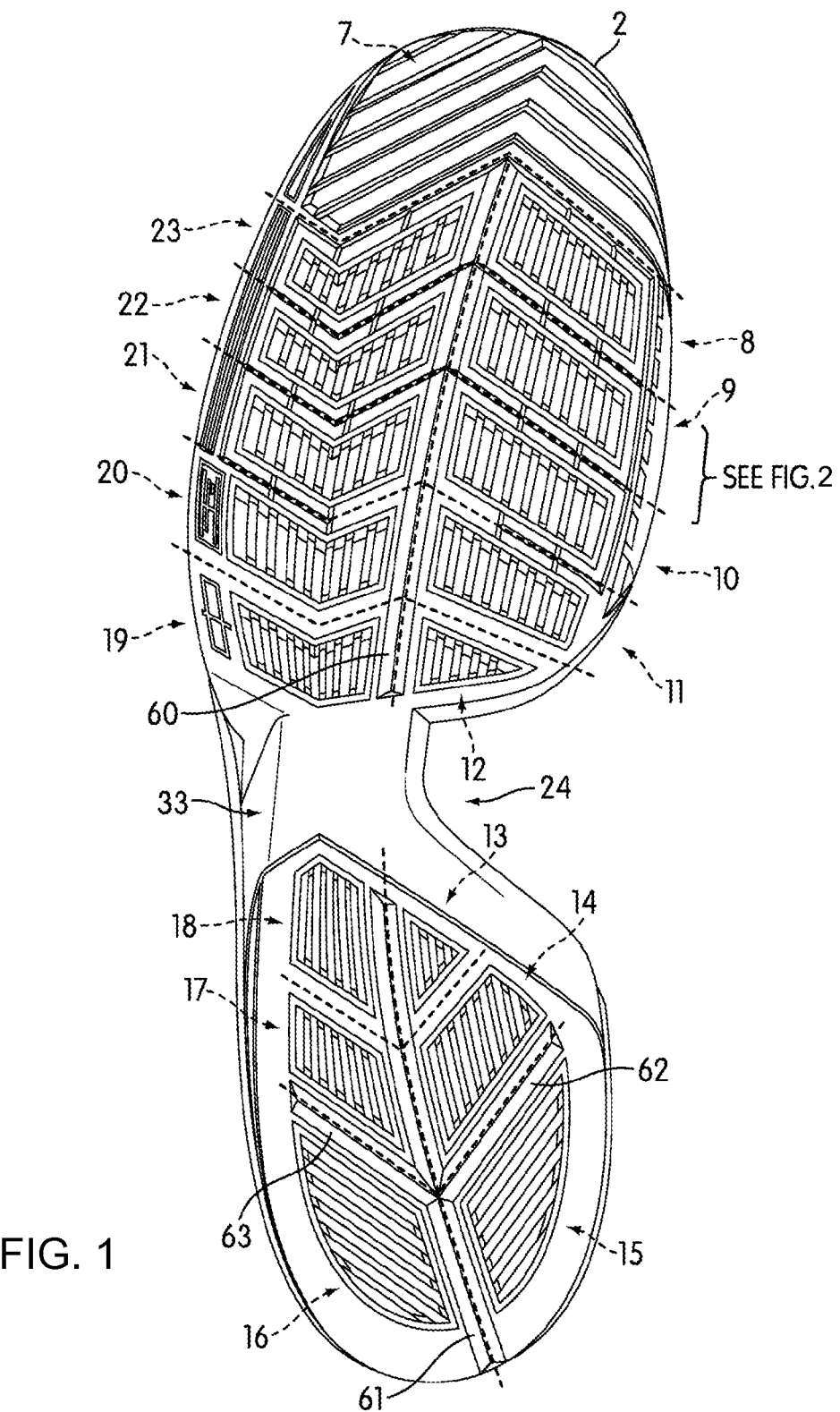
FIG. 1 is a bottom plan view of the outsole of a basketball shoe showing an outsole according to an embodiment, and with various zones marked for reference purposes.

A detailed description of exemplary, nonlimiting embodiments follows.

The elastomer compositions now disclosed include guayule rubber and a butadiene rubber. Nonlimiting examples of suitable butadiene rubbers include polybutadiene and block copolymers of butadiene and one or more other monomers, Raw guayule rubber has a substantial fraction of terpene compounds, perhaps up to about 10 wt % or 8 wt % terpene compounds. The disclosed rubber articles may be made from a composition using the raw guayule rubber or may be made using a guayule rubber from which at least a portion of the terpene compounds have been extracted. In certain preferred embodiments, the compositions are made using a guayule rubber from which a substantial portion, preferably substantially all or all, of the naturally-present terpene compounds have been extracted. The guayule rubber product of the extraction may have up to about 6 wt %, preferably up to about 5 wt %, more preferably up to about 2 wt %, and yet more preferably up to about 1 wt % terpene compounds, or may be free or substantially free of terpene compounds.

The elastomer compositions used to prepare the cured elastomer articles should include at least about 5 phr and should include generally up to about 20 phr guayule rubber. In various embodiments, the elastomer compositions include preferably from about 5 phr or from about 6 phr or from about 7 phr to about 20 phr or to about 19 phr, and more preferably from about 7 phr or from about 8 phr to about 15 phr or to about 12 phr, guayule rubber based on 100 phr rubber. The cured elastomer articles correspondingly include preferably from about 5 phr or from about 6 phr or from about 7 phr to about 20 phr or to about 19 phr, and more preferably from about 7 phr or from about 8 phr to about 15 phr or to about 12 phr, guayule rubber portions based on 100 phr cured rubber polymer.

The elastomer compositions also include a butadiene rubber, which may be polybutadiene or a butadiene block copolymer. Nonlimiting suitable examples of the butadiene rubber include polybutadienes, styrene-butadiene rubbers, acrylonitrile-butadiene copolymer rubbers, butadiene-propylene copolymer rubbers, butadiene-ethylene copolymer rubbers, butadiene-isoprene copolymers, and the like, which may be used in any combination along with the guayule rubber. In various preferred embodiments, the elastomer compositions include polybutadiene as the butadiene rubber. The combined weights of the guayule rubber and the butadiene rubber may be at least about 75 phr or at least about 80 phr or at least about 85 phr based on 100 phr elastomer of the elastomer compositions. The cured rubber articles correspondingly may contain combined weight portions from the guayule and butadiene rubber of at least about 75 phr or at least about 80 phr or at least about 85 phr based on 100 phr cured rubber polymer. For example, the combined weights of the guayule rubber and the polybutadiene may be from about 75 phr or from about 80 phr or from about 85 phr to about 90 phr or to about 95 phr or to 100 phr elastomer in the elastomer compositions and corresponding amounts of combined guayule and butadiene rubbers as a polymer portion of the cured rubber.

The elastomer compositions may include further elastomers. Nonlimiting examples of suitable further elastomers include ethylene-propylene-diene (EPDM) rubbers such as ethylene-propylene-cyclopentadiene terpolymer, ethylene-propylene-5-ethylidene-norbornene terpolymer, and ethylene-propylene-1,4-hexadiene terpolymer, isoprene-isobutylene copolymer rubber, and so on.

The elastomer compositions may include one or more curing agents selected from sulfur curing agents and free radical initiators.

Conventional sulfur-based curing agents may be used in the rubber compositions. Such curing agents are well known in the art and include elemental sulfur as well as a variety of organic sulfide, disulfide and polysulfide compounds. Examples include, without limitation, vulcanizing agents such as morpholine disulfide, 2-(4'-morpholinodithio)benzothiazole, and thiuram compounds such as tetramethylthiuram disulfide, tetraethylthiuram disulfide and dipentamethylenethiuram tetrasulfide. The vulcanizing agents may be used alone or in combination with each other. In a preferred embodiment, sulfur is used as the curing agent.

When sulfur-based curing agents are used, the rubber compositions may also contain conventional accelerators. Such accelerators and co-accelerators are known in the art and include without limitation, those based on dithiocarbamate, thiazole, amines, guanidines, xanthates, thioureas, thiurams, dithiophosphates, and sulfenamides. Non-limiting examples of accelerators include: zinc diisobutyldithiocarbamate, zinc salt of 2-mercaptobenzothiazole, hexamethylenetetramine, 1,3-diphenyl guanidine, zinc isopropyl xanthate, trimethyl thiourea, tetrabenzyl thiuram disulfide, zinc-O-,O-di-n-butylphosphorodithiolate, and N-t-butyl-2-benzothiazylsulfenamide. A non-limiting example of a rubber accelerator that generates non-carcinogenic nitrosamines is tetrabenzylthiuram disulfide. It is known to generate a nitrosamine, N-nitrosodibenzylamine, which is not carcinogenic according to published literature.

Preferred co-accelerators belong to a class of xanthogen polysulfides such as dialkyl xanthogen polysulfide. A non-limiting example of a dialkyl xanthogen polysulfide is diisopropyl xanthogen polysulfide, such as is commercially available as Robac AS-100, supplied by Robac Chemicals. Advantageously, Robac AS-100 is free of nitrogen, phosphorus, and metallic elements. It is recommended for use as an accelerator in vulcanization of guayule where the formation of N-nitrosamines and type-4 allergens is of prime concern. The dialkyl xanthogen polysulfides also act as a sulfur donor.

In various embodiments, the dialkyl xanthogen polysulfide accelerators show synergism with other accelerators, for example, zinc dibenzyl dithiocarbamate or tetrabenzyl thiuram disulfide (TBzTD), whether in the presence or absence of elemental sulfur. The xanthogen polysulfides also produce effective cure in the presence of thiazoles and sulfenamides. For example, a combination of the xanthogen polysulfide and a sulfenamide, such as N-t-butyl-2-benzothiazole sulfenamide (TBBS), is an effective accelerator system that functions in the absence of elemental sulfur. The xanthogen polysulfide accelerators can also be used in combination with other soluble sulfur donors. Typical treatment levels with the xanthogen polysulfide as accelerator are from 0.1-10 phr, and are advantageously 5 phr or less, or 2 phr or less. In a non-limiting example, a xanthogen polysulfide accelerator compound is used at about 0.6 phr.

A sulfur cure may also be activated with a rubber-soluble salt or soap provided in the rubber composition as the salt itself, for example zinc stearate, or as an anionic component and a cationic component that react to form the salt in situ, for example a metal oxide such as zinc oxide, calcium oxide, or magnesium oxide and a fatty acid such as stearic acid. These may be microencapsulated before being introduced into the rubber composition. In a preferred embodiment, zinc oxide and fatty acid are added to the rubber compound in a stoichiometric ratio of approximately 1 mole zinc oxide to 2 moles of fatty acid. In further preferred embodiments, the zinc oxide is microencapsulated in a wall material that withstands the temperature of mixing but that dissolves or ruptures at the temperature of the subsequent cure. In various embodiments, the zinc oxide is provided as particles having a diameter in the micrometer range. In other embodiments, zinc oxide comprises at least some particles of at least 100 nm or less. In a commercial embodiment, the zinc oxide comprises having an average diameter of 75 nm.

In various embodiments, the accelerator activators comprise metal complexes of fatty acids, which are referred to as "soaps." Zinc soaps include the soap, or salt, of a fatty acid such as one having from 8 to 36 carbon atoms or 8 to 26 carbon atoms. In a non-limiting embodiment, the fatty acids have 10-24 carbon atoms. Non-limiting examples include lauric acid, oleic acid, and stearic acid. The fatty acids form a soap with zinc by combining two moles of fatty acid with one mole of zinc. For activation, zinc soaps can be added directly to a rubber composition and can be encapsulated.

Zinc ionomer polymers may also be used as rubber cure activators. These activator compositions contain zinc and a polymeric component having a plurality of COOH groups, at least some of which are neutralized with the zinc. With polymeric zinc activators, sulfur cure can be activated at levels of zinc below those used in conventional systems. The compounded rubber composition may include 1-25 phr of a zinc ionomer or 0.01-0.5% by weight Zn based on the total weight of the rubber composition. Nonlimiting examples of suitable zinc ionomers include at least partially zinc neutralized copolymers of styrene and maleic anhydride, at least partially zinc neutralized graft copolymers of maleic anhydride, and at least partially zinc neutralized copolymers of α-olefins having two to eight carbons and α,β-ethylenically unsaturated carboxylic acids having three to eight carbons, optionally with further comonomers such as (meth)acrylates, for example ethylene and (meth)acrylic acid (where "(meth)acrylic" means, acrylic, methacrylic, or both acrylic and methacrylic and "(meth)acrylate" means, acrylate, methacrylate, or both acrylate and methacrylate). The concentration of the acidic monomer in the copolymer may be from 0.2% mol-50% mol, preferably from about 1-10% mol %. In addition to zinc, the rubber compositions can also contain other divalent metals that have been found to enhance the cure, sometimes in a synergistic fashion with the zinc. In various embodiments, the compositions further contain magnesium or calcium. Although not limited to theory, it is believed that rubber compositions containing Mg or Ca in addition to zinc contain the respective Mg and Ca in a form closely associated with carboxylic groups of the base copolymers, so as to form additional carboxylate groups on the polymers. The Mg- or Ca-containing activators can be formed in situ by combining suitable compounds such as MgO and CaO along with the zinc compounds in the methods described herein. The divalent Ca or Mg is generally added to the compositions herein as a compound or compounds comprising Ca.sup.2+ or Mg.sup.2+. Although potentially any such compound can be used, it is preferred to use the respective hydroxides (Ca(OH).sub.2 or Mg(OH).sub.2) or oxides (CaO or MgO). Using zinc ionomers, the rubber cure by sulfur vulcanizing agents can be activated with lower total concentrations of zinc as compared with other zinc activators, especially when used with fillers like silica that have active hydrogens on their surfaces.

The elastomers may also be cured with free radical initiators such as organic peroxides and azo compounds. A peroxide curing agent is required to crosslink elastomers that do not contain olefinic unsaturation but rather cure via hydrogen abstraction. Free radicals are generated by inducing peroxide decomposition, typically with heat, visible light, or ultraviolet light. For most rubber compounds, heat is a preferred method of inducing decomposition because the rubber composition tends to be opaque. However, in the case of transparent rubbers, UV and visible light may be used to initiate the decomposition. Nonlimiting examples of suitable free radical initiators include organic peroxides or azo compounds such as dialkyl organic peroxides, diacyl organic peroxides, peroxyketal organic peroxides, peroxyester organic peroxides, peroxydicarbonates, and peroxymonocarbonates. Particular examples of suitable organic peroxides include, but are not limited to, di-t-amyl peroxide; di-t-butyl peroxide; t-butyl cumyl peroxide; di-cumyl peroxide; di(2-methyl-1-phenyl-2-propyl) peroxide; t-butyl 2-methyl-1-phenyl-2-propyl peroxide; di(t-butylperoxy)-diisopropylbenzene; benzoyl peroxide; 1,1-di(t-butoxy)-3,3,5-trimethyl cyclohexane; 3,3,5,7,7-pentamethyl-1,2,4-trioxepane; cumyl hydroperoxide; t-butyl hydroperoxide; 2,5-dimethyl-2,5-di(t-butylperoxy) hexane; 2,5-dimethyl-2,5-di(t-butylperoxy)hexyne; 2,5-dimethyl-2,5-di(benzoylperoxy) hexane; 2,2'-bis(t-butylperoxy)-di-iso-propylbenzene; n-butyl 4,4-bis(t-butyl-peroxy)valerate; t-butyl perbenzoate; benzoyl peroxide; n-butyl 4,4'-bis(butylperoxy) valerate; t-amyl perbenzoate; α,α-bis(t-butylperoxy)diisopropylbenzene; and combinations thereof. Suitable azo compounds may include, but are not limited to, azobisisobutyronitrile (AIBN); 1,1'-azobis(cyclohexanecarbonitrile) (ABCN); 2,2'-azodi(2-methylbutyronitrile) (AMBN); 2,2'-azobis[2-(2-imidazolin-2-yl)propane]dihydrochloride; 2,2'-azobis[2-(2-imidazolin-2-yl)propane]disulfate dehydrate; 2,2'-azobis (2-methylpropionamidine)dihydrochloride; 2,2'-azobis[N-(2-carboxyethyl)-2-methylpropionamidine]hydrate; 2,2'-azobis{2-[1-(2-hydroxyethyl)-2-imidazolin-2-yl] propane}dihydrochloride; 2,2'-azobis[2-(2-imidazolin-2-yl) propane]; 2,2'-azobis(1-imino-1-pyrrolidino-2-ethylpropane)dihydrochloride; 2,2'-azobis{2-methyl-N-[1,1-bis(hydroxymethyl)-2-hydroxyethl]propionamide}; 2,2'-azobis[2-methyl-N-(2-hydroxyethyl)propionamide]; and any combinations of these.

The elastomer compositions may include one or more crosslinkers such as metal salts of ethylenically unsaturated acids, for example zinc diacrylate and magnesium dimethacrylate.

The elastomer compositions may include one or more of filler and pigment materials. Fillers may be used in rubber compositions to enhance properties, to save money, to facilitate processing, to improve physical properties, or for other reasons. Such fillers include silica, carbon black (which also functions as a pigment), clay, talc, calcium sulfate, calcium silicate, graphite, glass, mica, calcium metasilicate, barium sulfate, zinc sulfide, aluminum hydroxide, diatomaceous earth, carbonates (such as calcium carbonate, magnesium carbonate and the like), metals (such as titanium, tungsten, zinc, aluminum, bismuth, nickel, molybdenum, iron, copper, brass, boron, bronze, cobalt, beryllium, and alloys of these), metal oxides (such as zinc oxide, iron oxide, aluminum oxide, titanium oxide, magnesium oxide, zirconium oxide and the like), particulate synthetic plastics (such as high molecular weight polyethylene, polypropylene, polystyrene, polyethylene ionomeric resins, polyamide, polyester, polyurethane, polyimide, and the like), as well as organic fiber such as cotton flock, cellulose flock, cellulose pulp, leather fiber, and combinations of any of these. Silica is preferred in some embodiments. A variety of filler materials are known. Typical levels of these and other fillers include from about 10 phr to 100 phr or higher. In various embodiments, the compositions contain from about 10 to about 80, from about 30 to about 70, from about 40 to about 60, from about 50 to about 60, or from about 35 to about 60 phr filler. In various embodiments, the compositions comprise a silica filler. Typical levels of silica filler include from about 10 phr to 100 phr or higher. In various embodiments, the compositions contain from about 10 to about 80, from about 30 to about 70, from about 40 to about 60, 5 from about 0 to about 60, or from about 35 to about 60 phr filler. The elastomer composition may include any of a wide variety of black, white, or colored pigments Nonlimiting examples of suitable pigments include carbon black, titanium dioxide, iron oxide pigments such as black iron oxide and red iron oxide, zinc oxide, monoazo and diazo pigments, cobalt blue, ultramarine blue, bismuth vanadate yellow, azo metal complexes, copper phthalocyanines, anthraquinones, quinacridones, dioxazines, perylene pigments, and thioindigo pigments, which may be used in any combination. Pigments are typically selected and used in the amount required to obtain the desired color and color strength.

Typical compositions for use in preparing molded rubber outsoles for athletic shoes contain about 10 to about 80 phr filler.

The elastomer compositions may include a process oil to facilitate both compounding and processing. Process oils may come from petroleum, plant, or animal sources. The petroleum process oils may be hydrotreated to remove a large portion of the aromatic compounds. Petroleum-based oils can be selected from the group consisting of paraffinic oils, naphthenic oils, and aromatic oils. The non-petroleum-based oils may contain a sufficient level and distribution of fatty acid side chains to partially incorporate into the rubber composition at low levels or to act as internal plasticizers at higher levels. The oils derived from plant or animal sources can be classified by their iodine number. Plant- and animal-derived oils may contain double bonds, and each double bond can react with one iodine molecule. The iodine number, defined as the number of grams of iodine taken up by 100 grams of oil, gives a rough measure of the number of double bonds in an oil. The oil may have an iodine number of greater than 50 and, preferably, greater than 60. During crosslinking the double bonds are available for reaction with the unsaturated elastomer molecules. In another aspect, these oils are triglycerides of one or more unsaturated fatty acids. Such a plant- or animal-derived oil is capable of effectively crosslinking an unsaturated elastomer during crosslinking if the oil molecule contains a double bond on two or more of the three fatty acid side chains in an oil molecule. Preferred oils may have at least 50% of the fatty acid side chains with one or more sites of unsaturation. In this way, the unsaturated oils can facilitate processing of the rubber during the compounding phase and can be incorporated into the rubber network during the curing phase to enhance the physical properties of the rubber composition and prevent blooming.

In some embodiments the elastomer composition contains less than 5 phr (parts by weight per hundred parts of elastomer) of the process oil, preferably less than or equal to 3 phr. The rubber elastomer composition may contain from about 0.1 to about 5 phr of vegetable oil. In other embodiments, the elastomer compounds contain a maximum of 3 phr vegetable oil, or less than 3 phr. In other embodiments, the elastomer compounds may contain from 0.1 to 2 phr vegetable oil. Non-limiting examples of vegetable oils include peanut oil, sunflower oil, cottonseed oil, linseed oil, soybean oil, rapeseed oil, sesame oil, safflower oil, poppy seed oil, tung oil, wheat oil, olive oil, corn oil, castor oil, guayule seed oil, and mixtures thereof. Castor oil has unique chemistry in that it is the only source of an 18 carbon hydroxylated fatty acid with one double bond (12-hydroxyoleic acid or ricinoleic acid). This fatty acid consistently comprises about 90 wt % of castor oil.

The elastomer compositions may further include various additives such as coupling agents, titanium or zirconium compounds, antioxidants, antiozonants, UV inhibitors, and the like.

The elastomer compositions may contain coupling agents, such as those based on silanes. For example, athletic footwear have rubber outsoles that are generally prepared from silica filled rubber compositions by heating the compositions for suitable times and temperatures in compression molds. Silane coupling agents are commonly used to compatibilize the rubber resins with the filler and improve the physical properties. When present, the silane coupling agents may contribute to the stability and physical properties of the compositions, for example by compatibilizing or coupling the reinforcing filler with the rubber components. Silane coupling agents include those with amino, epoxy, (meth)acryl, chloro, and vinylyl functionality.

Examples of amino functional silane coupling agents include aminopropyltriethoxysilane; aminopropyltrimethoxysilane; aminopropylmethyldimethoxysilane; aminoethylaminopropyltrimethoxysilane; aminoethylaminopropyltriethoxysilane; aminoethylaminopropylmethyldimethoxysilane; diethylenetriaminopropyltrimethoxysilane; diethylenetriaminopropyltriethoxysilane; diethylenetriaminopropylmethyldimethoxysilane; diethylenetriaminopropylmethyldiethoxysilane; cyclohexylaminopropyltrimethoxysilane; hexanediaminomethyldiethoxysilane; anilinomethyltrimethoxysilane; anilinomethyltriethoxysilane; diethylaminomethyltriethoxysilane; (diethylaminoethyl)methyldiethoxysilane; and methylaminopropyltrimethoxysilane. Examples of sulfur functional silane coupling agents include bis(triethoxysilylpropyl)tetrasulfide; bis(triethoxysilylpropyl)disulfide; bis(3-ethoxydimethylsilylpropyl) oligosulfur; mercaptopropyltrimethoxysilane; mercaptopropyltriethoxysilane; mercaptopropylmethyldimethoxysilane; and 3-thiocyanatopropyltriethoxysilane. Examples of epoxy silane coupling agents include: glycidoxypropyltrimethoxysilane; glycidoxypropyltriethoxysilane; glycidoxypropylmethyldiethoxysilane; and glycidoxypropylmethyldimethoxysilane. Examples of (meth)acryl silane coupling agents include: methacryloxypropyltrimethoxysilane; methacryloxypropyltriethoxysilane; and methacryloxypropylmethyldimethoxysilane. Examples of chloro silane coupling agents include: chloropropyltrimethoxysilane; chloropropyltriethoxysilane; chloromethyltriethoxysilane; chloromethyltrimethoxysilane; and dichloromethyltriethoxysilane. Examples of vinylyl silane coupling agents include: vinyltrimethoxysilane; vinyltriethoxysilane; and vinyltris(2-methoxyethoxy)silane.

The elastomer compositions may contain at least one of titanium and zirconium compounds that contain a alkoxy group —OR bonded respectively to titanium or zirconium. Mixtures of these zirconium and titanium compounds may be used. Generally, the R group of the alkoxy group is an alkyl group having 8 or fewer carbon atoms. In a preferred embodiment, the R group contains 6 or fewer carbons, and more preferably contains 4 or fewer carbon atoms. Examples of alkyl groups containing 4 or fewer carbon atoms include methyl, ethyl, n-propyl, isopropyl, n-butyl, isobutyl, sec-butyl, and t-butyl.

In a preferred embodiment, the titanium or zirconium compound has 2 alkoxy groups bonded to the titanium or zirconium. In another preferred embodiment, there are 4 alkoxy groups —OR bonded to the central titanium or zirconium atom where R is as described above. Based on the above, there are several forms of the titanium and zirconium compounds. Preferred compounds include the tetraalkyl (those having four alkoxy groups bonded to the metal) and the chelate forms. A class of compounds that has shown good utility are chelates. Chelates in general, are those titanium or zirconium compounds that are complexed with an organic ligand system that contains two atoms or functional groups capable of forming covalent or dative bonds to the central titanium or zirconium compound. Generally, the atoms or functional groups which form covalent or dative bonds to the central atom are those that are highly electronegative and include oxygen, nitrogen, and sulfur. The two atoms or functional groups providing the ligand to the central titanium and zirconium atoms may be the same or different. In a preferred embodiment, the atoms bonded to the central titanium or zirconium atom through the chelate are oxygen. Examples of chelating ligands include, without limitation, acetylacetonate, ethyl acetylacetonate, triethanolamine, lactic acid and its salts such as the ammonium salt, glycolic acid and its salts, and esters of citric acid, such as diethyl citrate. A well known useful chelate is the titanium acetylacetonate chelate compound. Other chelating ligands such as triethanolamine, lactic acid ammonium salt, diethyl citrate, and ethyl acetylacetone may be used. It is also possible to use zirconium chelates instead titanium chelates. Generally, the compositions will have from about 0.01 parts to about 10 parts per hundred parts of rubber resin (phr) of the titanium or zirconium compound. These may be added in auxiliary compositions in the form of masterbatches admixed with a hydrophobic material, such as a petroleum wax, for protection from moisture. When liquid, the titanium or zirconium compound may be used on a carrier such as silica, titanium dioxide, or carbon black.

The zirconium or titanium chelates are generally highly colored, ranging from yellow to a dark red. This generally provides no problems if the chelate compounds are to be formulated into black rubber compositions. On the other hand, if white or lightly colored rubber compositions are to be formulated, then tetraalkyl and polymeric forms of the titanium and zirconium compounds are preferred, as they are not as deeply colored.

The elastomer compositions can be compounded in conventional rubber processing equipment. In a typical procedure, all components of the elastomer composition are compounded in a conventional mixer such as a Banbury mixer. If desired, the compounded elastomer may then be further mixed on a roller mill, at which pigments such as carbon black may be incorporated. The composition may be allowed to mature for a period of hours prior to the addition of sulfur and accelerators, when sulfur-based curing agents are used, or they may be added immediately on the roller mill. The accelerators may be added into the Banbury mixer in the later stages of the mixing cycle. Adding the accelerators into the Banbury mixer generally improves their distribution in the rubber composition. In general, elemental sulfur when used for curing is not added into the Banbury mixer. Organic sulfides (sulfur donating compounds) may be added to the Banbury mixer.

The elastomer compositions may be molded, cured, and finished by conventional means, including injection molding, compression molding, extrusion, and post-curing processes including cutting, grinding, sanding, tumbling with an abrasive media, and cryogenic deflashing. In general, the elastomer composition may be introduced into a mold and subjected to conditions of curing temperature and pressure for a time sufficient to develop the properties of the cured article. As is conventional, the curing may be characterized by parameters Ts2 and T90. These parameters are measured according to known methods by measuring the torque of an oscillated rubber disk while it is being cured. The time for development of 90% of the final torque is referred to as T90. The parameter Ts2 is a measure of how fast the cure develops and is called a measure of "scorch." In various embodiments, cured rubber compositions are characterized by cure under conditions where cure proceeds for a time equivalent to T90 or to T90 plus one minute. In this way, a cured rubber is cured to a stage at which, if measured by a rheometer, at least 90% of the total increase in torque from the uncured to the fully cured stated occurred or would have occurred due to the curing conditions imposed thereon. The compositions may be processed and cured by placing the compositions into a heated mold. The mold is placed into a press and held for a specified period of time at a temperature sufficient to achieve cure. Typically, the curing time is obtained from a rheometer curve, such as conventional in the rubber processing industry. For example, the moldable rubber compositions may be cured for a time equal to T90 plus one minute, where T90 is the time required for 90% of the viscosity to develop. Typical temperatures are generally from about 145 to 165.degree. C., and typical times can range from 3 to 9 minutes, though processing outside these times and temperature ranges is also possible, especially in large parts with thick cross sections.

An article comprising a cured elastomer prepared from the elastomer composition comprising guayule rubber and a butadiene rubber can have a dynamic coefficient of friction of at least about 0.95 or at least about 0.96 or at least about 0.97 or at least about 0.98 or at least about 0.99 or at least about 1.00, measured according to ASTM F2913. An article comprising a cured elastomer prepared from the elastomer composition comprising guayule rubber and a butadiene rubber can have a dynamic coefficient of friction of up to about 1.10 or up to about 1.08 or up to about 1.07 or up to about 1.06 or up to about 1.05, measured according to ASTM F2913. The cured elastomers prepared from the elastomer composition comprising guayule rubber and a butadiene rubber may also have crosslink densities of up to about $3.75 \times 10^{-4}$ moles crosslinks per cubic centimeter, preferably up to about $3.7 \times 10^{-4}$ moles crosslinks per cubic centimeter, more preferably up to about $3.65 \times 10^{-4}$ moles crosslinks per cubic centimeter, still more preferably up to about $3.6 \times 10^{-4}$ moles crosslinks per cubic centimeter, and still yet more preferably up to about $3.55 \times 10^{-4}$ moles crosslinks per cubic centimeter, measured by swelling in cyclohexane for 24 hours, after which the crosslink density is calculated using the Flory-Rehner equation, with the polymer-solvent interaction constant being taken as 0.367.

The cured elastomers prepared from the elastomer composition comprising guayule rubber and a butadiene rubber may have crosslink densities of from about $3.4 \times 10^{-4}$ moles crosslinks per cubic centimeter or from about $3.45 \times 10^{-4}$ moles crosslinks per cubic centimeter or from about $3.47 \times 10^{-4}$ moles crosslinks per cubic centimeter to about $3.75 \times 10^{-4}$ moles crosslinks per cubic centimeter, preferably up to about $3.7 \times 10^{-4}$ moles crosslinks per cubic centimeter, more preferably. up to about $3.65 \times 10^{-4}$ moles crosslinks per cubic centimeter, still more preferably up to about $3.6 \times 10^{-4}$ moles crosslinks per cubic centimeter or up to about $3.55 \times 10^{-4}$ moles crosslinks per cubic centimeter.

The elastomer compositions may be used to prepare a wide variety of articles. Non-limiting examples of such articles include footwear, hoses, belts, gaskets, vibration damping fixtures and industrial products, gloves, catheters, and other medical devices, and commodity items such as tires or parts or elements used in making such articles. The disclosed compositions may be used, for example, to make footwear, outsoles or traction elements of outsoles for footwear, grip tape, for example for skateboards, hand grips, for example for golf clubs and tools, covers for sport balls, yoga mats, palms of gloves, especially sport gloves like soccer goalie gloves, traction elements for a conveyor belts, floor mats, traction elements for other floor coverings such for stair treads, knob covers, and other applications where traction, especially wet traction, is needed or desirable. The disclosed rubber composition may safely be used in applications where the equipment contacts food because guayule rubber lacks the latex proteins that cause allergic reactions to Hevea rubber.

In various embodiments, the cured rubber compositions made with guayule rubber may have a coefficient of friction that is at least 5% higher, preferably at least 10% higher, more preferably at least 15% higher, yet more preferably at least 20% higher, and still more preferably at least 25% higher than a cured rubber of the same formulation except using Hevea rubber instead of guayule rubber or a crosslink density that is at least 5% lower, preferably at least 8% lower, more preferably at least 10% lower, yet more preferably at least 12% lower, and still more preferably at least 15% lower than a cured rubber of the same formulation except using Hevea rubber instead of guayule rubber; or both one of the higher percentages of coefficient of friction and the lower percentages of crosslink density together as compared to a cured rubber of the same formulation except using Hevea rubber instead of guayule rubber.

In certain embodiments, footwear outsoles or traction elements of outsoles are made from the disclosed guayule rubber compositions. In particular, such footwear outsoles may have cured rubber or cured rubber elements prepared from the guayule rubber compositions in the forefoot area, heel area, or both. The forefoot area is the area underlying a foot's toes, the ball of the foot, or both while the outsole heel area underlies a foot's heel. In some embodiments, an article of footwear has an outsole that includes one or a plurality of contact zones. Each of those contact zones includes perimeter regions formed from a harder elastomeric material, as well as one or a plurality of elements formed from the disclosed rubber compound. The traction element or elements within a particular contact zone may be generally planar in shape and aligned in parallel along on orientation direction for that contact zone. The traction elements may, when in an undeformed state, be a part of and extend beyond the perimeter regions of a contact zone of the outsole. In response to a shear force, the traction elements may be deformable so as to rest within a volume formed by the perimeter regions.

Figure 2:
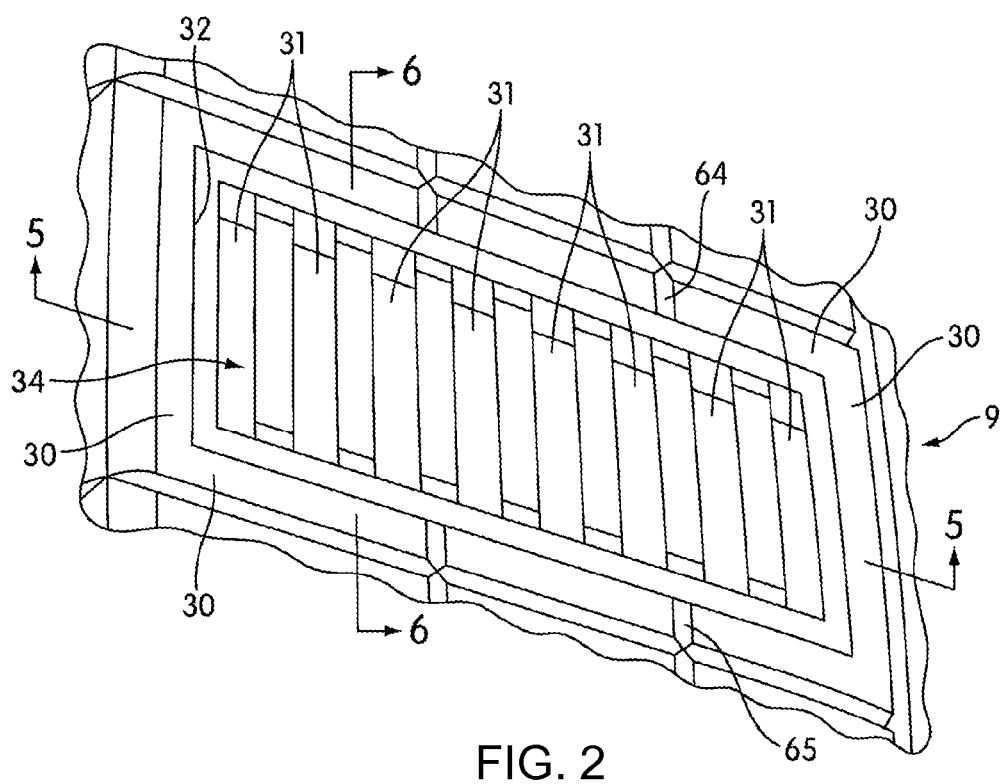
FIG. 2 is an enlarged view of a contact zone of the outsole in FIG. 1.

In one example illustrated by FIGS. 1 and 2, the guayule-containing composition may be used in preparing one or more of numerous zones of an example athletic footwear outsole 2 that contact a playing surface when a wearer participates in a basketball game or other activity. FIG. 1 is a bottom plan view of outsole 2 that identifies various contact zones with broken line boundaries. For example, contact zone 7 generally lies under the toes of a shoe wearer. Contact zones 8-12 and 19-23 generally lie under forefoot and midfoot regions of a shoe wearer and extend from contact zone 7 to just forward of arch region 24. Contact zones 13-18 generally lie under the hindfoot regions of a wearer and extend rearward from arch region 24. The number, size, shape and arrangement of contact zones shown in FIG. 1 merely represent one exemplary embodiment. In other embodiments, the size, number, shape and arrangement of contact zones may vary considerably.

Outsole 2 has a main body 33 formed from the hard elastomeric material. Contact zone 7 includes a relatively coarse herringbone tread pattern formed in main body 33, and is a single material contact zone. In particular, contact zone 7 may contain an elastomeric material other than the disclosed cured guayule-containing elastomer composition on its exposed surfaces. Contact zones 8-23 may include both hard elastomeric material elements and traction elements made from the cured guayule-containing elastomer composition.

In the embodiment of outsole 2, each of zones 8-23 includes a cavity formed in main body 33. Each cavity is surrounded by a perimeter regions of the hard elastomeric material of main body 33 and includes an insert made with traction elements of the cured guayule-containing elastomer composition. Each of those inserts includes a plurality of the traction elements having relatively short lengths, with traction elements of a particular insert being parallel to one another.

FIG. 2 is an enlarged view of a portion of outsole 2 that includes contact zone 9. Contact zone 9 includes a cavity 32 formed in the hard elastomeric material of main body 33. Perimeter regions 30 form walls surrounding cavity 32 and are integral elements of main body 33. Each of contact zones 8 and 10-23 similarly includes a cavity formed in main body 33. The shapes and transverse dimensions of those cavities may vary significantly, but each of those cavities may have a depth similar to that of cavity 32. Each of those cavities is similarly surrounded by perimeter regions that are integral elements of main body 33 and that form cavity walls. Insert 34 is attached to main body 33 and rests within cavity 32. Insert 34 is bonded to the surface of cavity 32 and to adjacent portions of the cavity 32 interior walls. Insert 34 includes eight integral traction elements 31 extending outward from cavity 32. Each of traction elements 31 is separated from other tractions elements 31 of insert 34. Each of the separation distances between elements 31 may, but need not, be the same. Traction elements 31 at the ends of insert 34 are also separated from the interior faces of cavity 32 walls. Both end separation distances for zone 9 may, but need not be, the same.

Each of contact zones 8 and 10-23 similarly includes an insert with traction elements made of the cured guayule-containing elastomer composition. The inserts of other contact zones may vary in size, shape and transverse dimensions, and may also vary in the orientation, length and number of fraction elements. However, each of the other inserts also fills (and is bonded) to an inward portion of a contact zone cavity and each of those inserts includes a plurality of parallel traction elements.

In various embodiments of outsole 2, and as shown in FIG. 1, traction elements in the forefoot and midfoot regions may generally be oriented so as to be roughly parallel to the length of the fore- and midfoot regions. As also shown in FIG. 1, a front flex groove 60 is located approximately on the midline of outsole 2 and separates medial zones 8-12 from lateral zones 19-23. The chevrons of zones 19-23 are generally in alignment, which alignment allows flexing of the lateral side outsole but helps to resist outsole instability. A rear flex groove 61 separates zones 13-15 from zones 16 through 18, with branching flex grooves 62 and 63 respectively extending medially and laterally. Narrower flex grooves separate other portions of outsole 2. Specifically, narrow flex grooves separate zone 7 from zone 8, zone 8 from zone 9, a portion of zone 9 from a portion of zone 10, a portion of zone 20 from a portion of zone 21, zone 21 from zone 22, zone 22 from zone 23, and zone 23 from zone 7. In other cases, the perimeter regions of adjacent zones are continuous and there is no separating flex groove (see, e.g., zones 11 and 12, zones 19 and 20, zones 13 and 14, zones 17 and 18). Other embodiments may have different configurations of flex grooves, or may lack flex grooves.

The traction element orientations of outsole 2 are merely one exemplary embodiment, however. In other embodiments, traction elements may be oriented differently. The shape, number, size and/or distribution of traction elements of the cured guayule rubber-containing elastomer may vary in other embodiments. Similarly, traction element sizes and shapes of the traction elements of the cured guayule rubber-containing elastomer can also vary. Planar traction elements need not be trapezoidal and can have other shapes. Some fraction elements can be thicker than other traction elements. For example, traction elements at the ends of an insert might be thinner that other traction elements of that insert.

The following examples illustrate, but do not in any way limit, the scope of the methods and compositions as described and claimed. All parts are parts by weight unless otherwise noted.

EXAMPLES

Examples of the Invention

Two forms of natural guayule rubber were tested, raw guayule, which contains 6 to 8 wt % terpene-containing resin, (Example 1) and extracted guayule, which is a grade from which the terpene-containing resin has been extracted so that its content in the guayule is less than 2 wt % (Example 2). The samples of guayule rubber tested were obtained from Yulex Corporation, Phoenix, Ariz. A control rubber compound was prepared using natural Hevea rubber (Comparative Example A).

TABLE 1

|  | Example 1 (parts by weight) | Example 2 (parts by weight) | Comparative Example A (parts by weight) |
|---|---|---|---|
| Guayule rubber (raw) | 10 | — | — |
| Guayule rubber (extracted) | — | 10 | — |
| Hevea rubber | — | — | 10 |
| UBEPOL-150[1] | 80 | 80 | 80 |
| PERBUNAN ® 3965F[2] | 10 | 10 | 10 |
| STRUKTOL ® 60 NS[3] | 3 | 3 | 3 |
| ULTRASIL ® VN 3 GR[4] | 52 | 52 | 52 |
| RHENOGRAN ® ZnO-80[5] | 6.25 | 6.25 | 6.25 |
| Soybean oil | 1 | 1 | 1 |
| Polyethylene glycol[6] | 3 | 3 | 3 |
| urea activator | 2 | 2 | 2 |
| Stearic acid | 1 | 1 | 1 |
| microcrystalline wax | 0.5 | 0.5 | 0.5 |
| BHT (butylated hydroxytoluene) | 1 | 1 | 1 |
| TBzTD-75[7] | 0.4 | 0.4 | 0.4 |
| Robac AS100[8] | 1 | 1 | 1 |
| SU135/SAT150[9] | 2.6 | 2.6 | 2.6 |

[1]UBEPOL-150 polybutadiene, available from UBE America Inc. (Mooney viscosity ML(1 + 4), 100° C.) = 43; solution viscosity (5 wt % in toluene at 25° C.) = 75; volatile matter = 0.3%; ash = 0.05%; specific gravity = 0.91, microstructure = 98 wt % cis, 1 wt % trans, 1 wt % vinyl; $M_w$ = 560,000, $M_n$ = 200,000, polydispersity ($M_w/M_n$) = 2.8).
[2]PERBUNAN ® 3965F butadiene-acrylonitrile copolymer, available from Lanxess Deutschland GmbH (Mooney viscosity ML(1 + 4), 100° C.) = 65; acrylonitrile content = 39 wt %; volatile matter ≤0.7 wt %; specific gravity = 0.99; total ash ≤0.8 wt %).
[3]STRUKTOL ® 60 NS homogenizing agent available from Schill + Seilacher "Struktol" GmbH (mixture of light aliphatic hydrocarbon resins).
[4]ULTRASIL ® VN 3 GR amorphous silica, available from Evonik Industries.
[5]RHENOGRAN ® ZnO-80 zinc oxide, 80%, available from Rhein Chemie.
[6]$M_n$ = 3000 to 4000
[7]75 wt % tetrabenzyl thiuram disulfide in 25 wt % polymer binder.
[8]Robac AS100 diisopropyl xanthogen polysulfide, available from Robac Specialty Rubber and Polymer Chemicals.
[9]Mixture of Struktol ® SU 135 (75% sulfur)/Atnen ® SAT-150 (80% sulfur)

The materials listed in Table 1 for each example were compounded, molded into a plaque and then cured by T90+1 minutes at 150° C. The cured plaques were tested for physical properties, which are recorded in Table 2. Table 2 includes a multiple values when a test was repeated.

TABLE 2

|  | Example 1 | Example 2 | Comparative Example A |
|---|---|---|---|
| Hardness, Shore A[10] | 67-68 | 67-68 | 70-71 |
| Specific gravity[11] | 1.15-1.16 | 1.14-1.16 | 1.15-1.15 |
| 300% Modulus (kg/cm$^2$)[12] | 30-30-32 | 37-38-38 | 57-59-60 |
| Tensile strength at rupture (kg/cm$^2$)[12] | 145-148-153 | 154-160-170 | 147-135-140 |
| Elongation (%)[12] | 765-802-928 | 748-759-760 | 626-595-608 |
| Tear strength (kg/cm$^2$)[13] | 31-35-35 | 38-42-42 | 39-45-41 |
| Abrasion (cm$^3$ loss)[14] | 0.26-0.28 | 0.22-0.24 | 0.23-0.24 |
| Dynamic coefficient of friction (average)[15] | 0.951 | 1.032 | 0.845 |
| Standard deviation for measured dynamic coefficient of friction | 0.034 | 0.019 | 0.026 |
| Crosslink density (mol/cm$^3$) | 3.49E−4 | 3.50E−4 | 3.95E−4 |

[10]Measured according to ASTM D2240.
[11]Measured according to ASTM D792.
[12]Measured according to ASTM D412, Test Method A (Dumbbell and Straight Section Specimens).
[13]Measured according to ASTM D624.
[14]Measured according to ASTM D1630.
[15]Measured according to ASTM F2913

The test results reproduced in Table 2 demonstrate that replacement of Hevea rubber with guayule rubber increases coefficient of friction while maintaining the other physical properties.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An article prepared by curing an elastomer composition, comprising guayule rubber and a butadiene rubber, wherein the elastomer composition comprises at least about 5 phr guayule rubber based on 100 phr elastomer, wherein the butadiene rubber comprises polybutadiene, and wherein the cured elastomer is a traction element bonded to a surface of an outsole of an article of footwear.

2. An article according to claim 1, wherein the cured elastomer has a dynamic coefficient of friction of at least about 0.95 measured according to ASTM F2913.

3. An article according to claim 1, wherein the elastomer portion comprises from about 5 to about 20 phr guayule rubber and at least about 75 phr of the combined weights of guayule rubber and the butadiene rubber, in each case based on 100 phr elastomer.

4. An article according to claim 1, wherein the traction element is bonded in a contact zone on a bottom of the outsole lying under one of a forefoot, midfoot, or hindfoot region of the article of footwear.

5. An article according to claim 4, wherein the outsole is made of an elastomeric material that is harder than the cured elastomer composition comprising the guayule rubber.

6. An article according to claim 1, wherein the outsole is made of an elastomeric material that is harder than the cured elastomer composition comprising the guayule rubber.

7. An article according to claim 1, wherein the elastomer composition further comprises a member selected from the group consisting of ethylene-propylene-diene rubbers, isoprene-isobutylene copolymers, and butadiene block copolymers.

8. An article according to claim 1, wherein the guayule rubber comprises up to about 2 wt % terpene compounds.

9. An article according to claim 1, wherein the elastomer composition comprises from about 10 to about 80 phr filler based on 100 phr elastomer.

10. An article according to claim 1, wherein the cured elastomer has a dynamic coefficient of friction of at least about 1.0 measured according to ASTM F2913 and a crosslink density of from about $3.4 \times 10^{-4}$ moles crosslinks per cubic centimeter up to about $3.75 \times 10^{-4}$ moles crosslinks per cubic centimeter.

11. An article of footwear comprising an outsole, the outsole comprising a traction element comprising a cured elastomer composition comprising a guayule rubber portion and a butadiene rubber portion, wherein the cured elastomer composition has a dynamic coefficient of friction of at least about 0.95, measured according to ASTM F2913, wherein the butadiene rubber portion comprises polybutadiene, and wherein the cured elastomer composition comprises at least about 5 phr of the guayule rubber portion based on 100 phr elastomer.

12. An article according to claim 11, wherein the guayule rubber portion is prepared from a guayule rubber comprising up to about 2 wt % terpene compounds.

13. An article according to claim 11, wherein the cured elastomer composition comprises from about 75 phr to 100 phr of the combined weights of the guayule rubber and the butadiene rubber portions based on 100 phr elastomer.

14. An article according to claim 11, wherein the cured elastomer comprises from about 10 to about 80 phr filler based on 100 phr elastomer.

15. An article of footwear according to claim 11, wherein the cured elastomer composition comprises from about 5 phr to about 20 phr of the guayule rubber portion based on 100 phr elastomer.

16. An article of footwear according to claim 11, wherein the outsole is made of an elastomeric material that is harder than the cured elastomer composition comprising the guayule rubber.

17. An article according to claim 11, wherein the elastomer composition further comprises a member selected from the group consisting of ethylene-propylene-diene rubbers, isoprene-isobutylene copolymers, and butadiene block copolymers.

18. An article according to claim 11, wherein the cured elastomer has a dynamic coefficient of friction of at least about 1.0 measured according to ASTM F2913 and a cross-link density of from about $3.4 \times 10^{-4}$ moles crosslinks per cubic centimeter up to about $3.75 \times 10^{-4}$ moles crosslinks per cubic centimeter.

19. An article according to claim 11, wherein the outsole comprises a perimeter region formed around the traction element wherein the perimeter region is formed of a elastomeric material that is harder than the cured rubber composition of the traction element.

20. An article according to claim 19, wherein the traction element is located in a cavity formed by the perimeter region.

\* \* \* \* \*